United States Patent [19]

Nozick

[11] Patent Number: 4,581,489
[45] Date of Patent: Apr. 8, 1986

[54] MODULAR CONNECTION SYSTEM FOR A TELEPHONE DISTRIBUTION FRAME

[76] Inventor: Jacques Nozick, 28 rue Broca, 75005 Paris, France

[21] Appl. No.: 621,755

[22] Filed: Jun. 18, 1984

[30] Foreign Application Priority Data

Jul. 29, 1983 [FR] France .................. 83 12516

[51] Int. Cl.[4] .............................................. H04Q 1/14
[52] U.S. Cl. ...................................... 179/98; 361/395; 361/428; 339/198 GA
[58] Field of Search ................. 179/98; 361/394, 399, 361/415, 428, 429; 339/198 GA

[56] References Cited

U.S. PATENT DOCUMENTS

| | | | |
|---|---|---|---|
| 3,753,216 | 8/1973 | Johnson et al. ............... | 339/198 R |
| 3,756,637 | 9/1973 | Wildi ....................... | 287/189.36 M |
| 3,850,301 | 11/1974 | Flenige ..................... | 211/26 |
| 4,039,902 | 8/1977 | Lacan et al. ................ | 361/395 |
| 4,087,648 | 5/1978 | Giacoppo .................... | 179/98 |
| 4,131,934 | 12/1978 | Becker et al. ............... | 361/428 |
| 4,204,095 | 5/1980 | DeLuca et al. ............... | 179/98 |
| 4,309,736 | 1/1982 | Lissillour .................. | 361/119 |
| 4,366,528 | 12/1982 | Cole ........................ | 361/429 |
| 4,371,757 | 2/1983 | Debortoli et al. ............ | 179/98 |
| 4,442,476 | 4/1984 | Lenderking et al. ........... | 361/395 |
| 4,496,057 | 1/1985 | Zenitani et al. ............. | 211/26 |
| 4,510,552 | 4/1985 | Kanno et al. ................ | 361/413 |

FOREIGN PATENT DOCUMENTS

| | | | |
|---|---|---|---|
| 2711783 | 9/1978 | Fed. Rep. of Germany ........ | 179/98 |
| 2834708 | 2/1980 | Fed. Rep. of Germany ........ | 179/98 |

*Primary Examiner*—Gene Z. Rubinson
*Assistant Examiner*—Elio DiVito
*Attorney, Agent, or Firm*—Sughrue, Mion, Zinn, Macpeak and Seas

[57] ABSTRACT

The system comprises a plurality of modules (1) fitted with wire guides (21, 22) and directly mounted on a free-standing rail (2) which is advantageously in the form of an extruded bar having fixing slots. The bar can be held in place simply by a pair of brackets, one near each of its ends. Conventional frame members can be omitted. The modules can be stacked in any desired configuration at any height up the bar. Naturally a particular installation may make use of a plurality of vertical, module-carrying bars.

5 Claims, 8 Drawing Figures

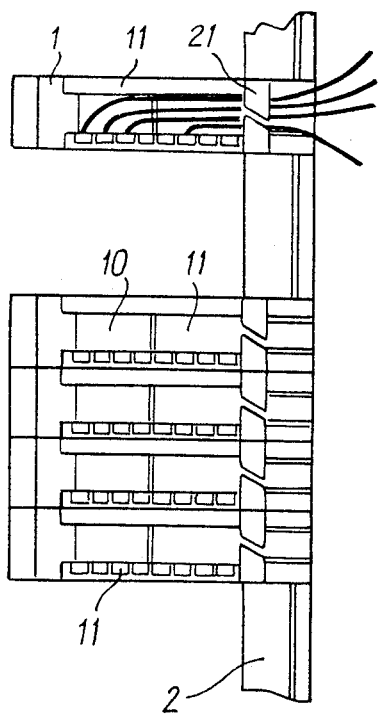
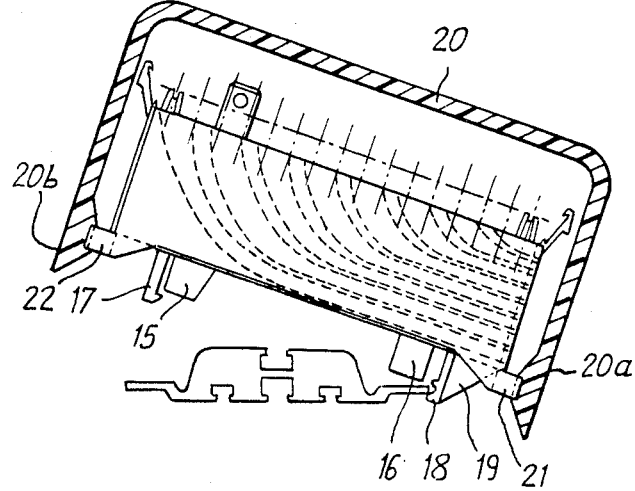
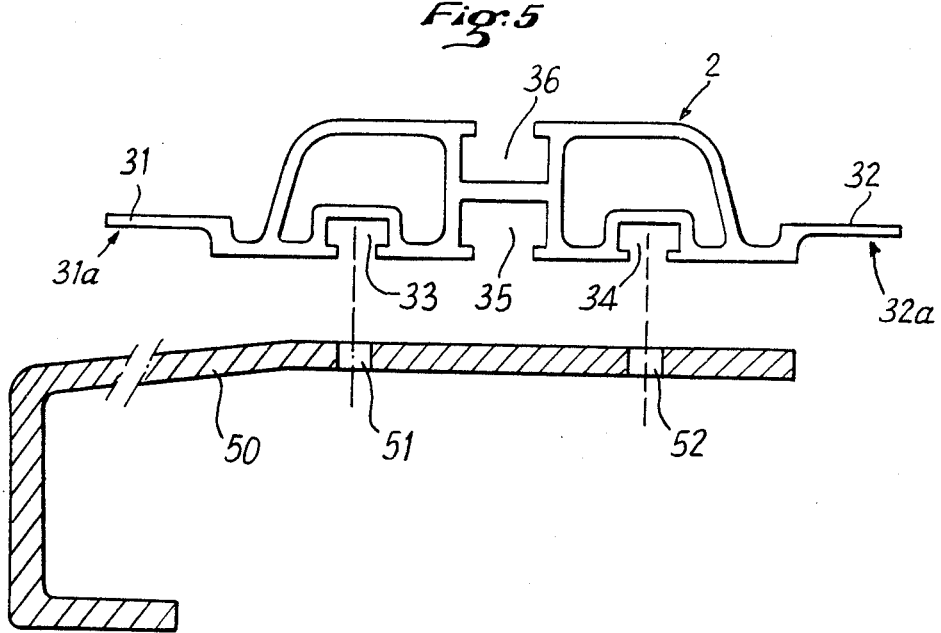

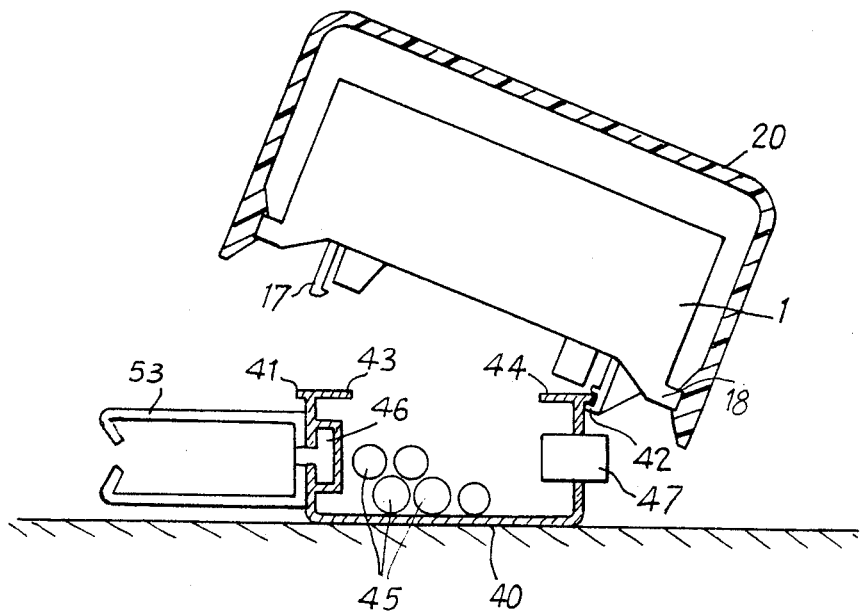
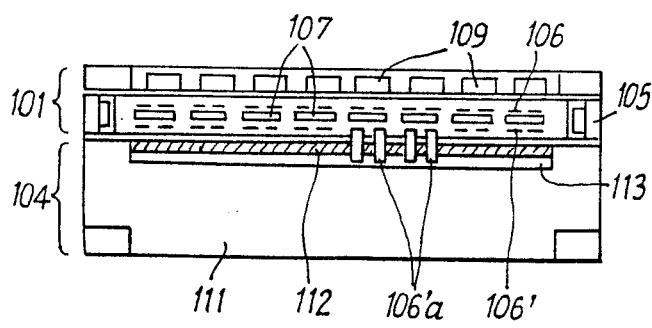
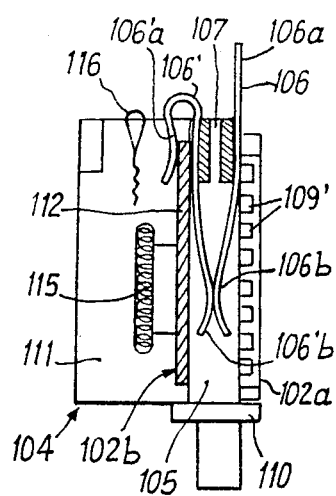

MODULAR CONNECTION SYSTEM FOR A TELEPHONE DISTRIBUTION FRAME

The present invention relates to a modular connection system for a telephone distribution frame of the type comprising bars which are generally vertical and on which connection members are fixed, eg. portions of a connection strip or of a cable terminator.

BACKGROUND OF THE INVENTION

The connection members in use up to now comprise modules which are assembled on blocks of predetermined sizes, each block carrying a predetermined number of modules. Various accessories are also mounted on each block such as label holders, wire guides, etc., and the blocks are fixed to vertical bars which themselves constitute part of a frame structure. Other accessories such as rings, hooks, cable clamps, etc., are fixed to the frame structure for passing and guiding cables and jumpers. The purpose of such distribution frame structures is to provide interconnection flexibility. However, this flexibility is limited and constrained by the need to install modules in complete blocks. Further, the frame architecture is complex and expensive.

Preferred embodiments of the present invention provide a considerably simplified system for constructing telephone distribution frames.

SUMMARY OF THE INVENTION

The present invention provides a modular connection system for a telephone distribution frame, the system comprising at least one vertical bar and connection members or modules each fixable to said bar, said modules being generally rectangular in shape and constituting, for example, a portion of a connection strip or of a cable termination, the improvement wherein the vertical bar is strong enough to directly receive and support said modules, being preferably in the form of an free-standing extruded rail, and having at least three longitudinal module-fixing zones extending over the entire length of the bar, and each module including at least three means on a rear face thereof corresponding to respective ones of said longitudinal module-fixing zones of the bar.

This enables the bases on which blocks of modules used to be constituted to be omitted, with the modules being directly assembled to the vertical bar. The numbers of like modules which are assembled adjacent to one another to constitute a "block" in the present invention can thus be adapted to specific requirements without constraints due to predetermined block sizes. Connection strips and cable terminations can be of the required dimension to within the capacity of a single module. Further, since there are no block bases, and the modules are fixed directly to the vertical bar, the modules can be disposed at any position along the height of the bar.

In an advantageous embodiment, each module includes a wire-guide on at least one side, or wire-outlet face thereof. The wire guide may be constituted in known manner by a ring which projects from the module, the ring being split, preferably by an oblique slot through its periphery.

Preferably, the bar has two abutment zones on its module-receiving face and two hooking zones on an opposite face, thereby constituting four module-fixing zones, and each module includes two feet for engaging said abutment zones, and two hooks for engaging said hooking zones, at least one of said hooks being flexible. Thus one of the hooks can act as a hinge while the other acts as a resilient member for snap-fixing the module to the vertical bar.

The free-standing rail may include at least one fixing slot for receiving fixing means such as the head of a screw. Accessories such as rings, hooks or cable clamps may thus be fixed to the rail.

BRIEF DESCRIPTION OF THE DRAWINGS

Embodiments of the invention are described by way of example with reference to the accompanying drawings, in which:

FIG. 3 is a side view of the stack shown in FIG. 2;

FIG. 4 is a plan view similar to FIG. 1 showing a module being fixed to a rail or being removed therefrom;

FIG. 5 is an end view of a rail and a section through a wire-guiding hook about to be attached to the rail;

FIG. 6 is a view similar to FIG. 4 showing a variant free-standing rail;

FIG. 7 is a view similar to FIG. 2 showing two juxtaposed modules, one of them being a circuit-breaking module and the other being an auxiliary module; and FIG. 8 is a side view of the FIG. 7 assembly, partially cut away to show an example of internal structure in diagrammatic form.

MORE DETAILED DESCRIPTION

Figure 1:
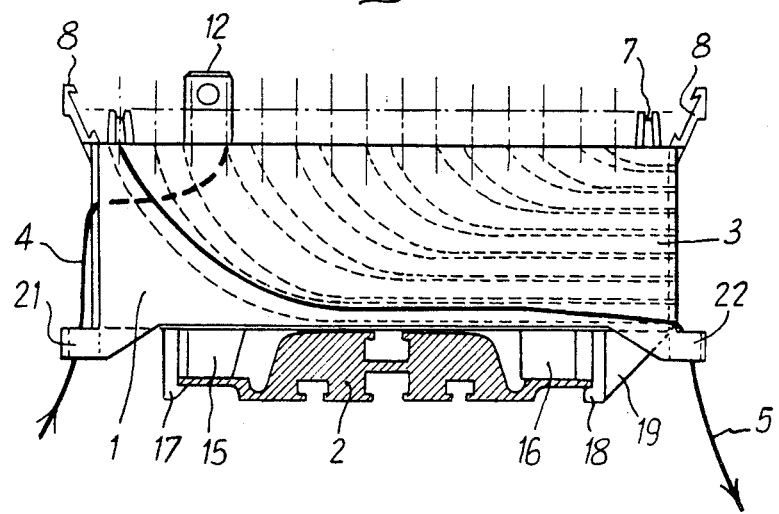
FIG. 1 is a plan view of a module mounted on a free-standing rail in a system in accordance with the invention, the rail being shown in section, and hidden wire-passing channels through the module being shown in dashed lines.
Figure 2:
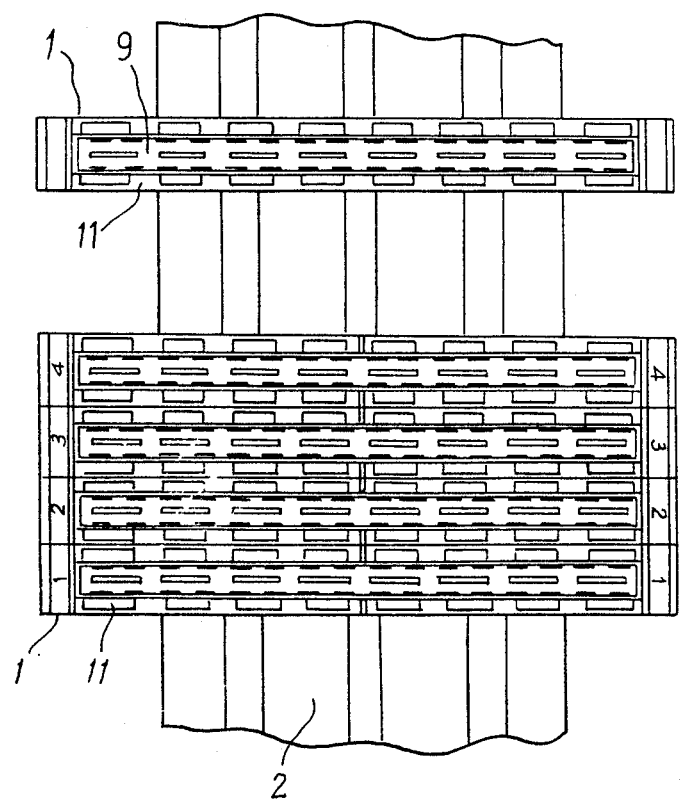
FIG. 2 is a front view of a plurality of modules stacked on a rail in a system in accordance with the invention.

FIGS. 1, 2 and 3 show a module 1 mounted on a free-standing rail 2. The module has two hollow walls: in each face it includes L-shaped channels 3 which establish paths between a row of contacts on the top face and on a corresponding side face for passing wires 4, 5. By way of example, the module shown is one which includes: wire-stripping contacts 7: label carriers 8; a contact support strip 9; a base 10; two hollow wire-passing walls 11; and cut-out pegs 12.

For fixing to the rail 2, the module includes two feet 15 and 16 and two associated hooks 17 and 18. The hook 17 is relatively flexible for snap-fixing, while the hook 18 is reinforced by a fin 19, so that it can be used as a hinge when placing the module on a rail or when removing therefrom, as shown in FIG. 4.

From each side having openings to the wire-passing channels, there projects a wire-guide 21 or 22 through which wires 4 and 5 respectively are passed. As can be seen in FIG. 3, each wire-guide may be in the form of a ring with an oblique slot in its circumference through which wires are inserted into the ring. The wires can thus be placed where required and then held in place without recourse to components other than the modules and the support rail.

FIG. 4 is a section through a protective cover 20 which may cover a series of modules and which is snap-fitted along its edges 20a and 20b to portions projecting sideways from the modules, eg. their wire-guiding rings 21 and 22. Advantageously, the cover 20 is a molding of thermoplastic material which is sufficiently flexible for easy snap fitting. It may be used to carry labels or other information about the modules it protects.

FIG. 5 shows a first example of a free-standing rail 2. It includes side strips 31 and 32 whose outside edges 31a and 32a engage the hooks 17 and 18 of the modules. The plane faces of the strips 31 and 32 serve as abutment surfaces for the feet 15 and 16 of the modules. The rail advantageously includes longitudinally extending grooves 33, 34, 35, and 36 having relatively narrow entrances for constituting fixing slots. Thus, the rail may be directly fixed to a cable-guiding hook 50 which is pierced by holes 51 and 52 for receiving fastenings which also engage the fixing slots 33 and 34.

The fixing slots can receive screws or bolts of various sizes, eg. by holding the head captive and leaving the shank to project through the slot and then through the holes 51 or 52. It is thus possible to build up a distribution frame simply by fixing rails 2 near their top and their bottom ends respectively to suitable horizontal supports, leaving the rail to stand free between its end supports.

FIG. 6 is a cross section through a second example of a free-standing rail 40. In this example, the rail is generally of channel section with strips 43 and 44 running along the edges of its flanges to receive the feet 15 and 16 of the modules and to provide rims 41 and 42 behind which the hooks 17 and 18 can engage. The unencumbered space inside the channel itself an be used to pass cables 45. A single slotted fixing groove 46 is shown located in one of the flanges and for fixing to a bracket 53. Clearly several more such slotted fixing grooves could also be provided. It is also possible with relatively simple tools to make holes in the flanges or in the web of the rail 40, eg. for fixing an auxiliary component such as a connector 47.

Modules for any desired function can be installed at any chosen level up a rail. Typical functions include points for breaking circuits, points for testing circuits, points for flexibility jumpering, points for protection circuits, points for fitting lamps, etc. FIGS. 7 and 8 show a circuit breaking module 101 and an auxiliary module 104.

The breaking module 101 comprises a generally plane housing 105 having plane faces 102a and 102b. Springs 106, 106' are disposed inside the housing 105 in two parallel rows to constitute sixteen pairs of contacts (ie. sufficient contacts to be able to interrupt both wires of eight pairs). The rear face of the housing is fixable to a support rail (not shown in FIGS. 7 and 8), in the same manner as described with reference to FIGS. 1 to 6. The free ends 106a and 106'a of the springs in each pair of springs project from the front face of the housing (ie. through its face which is opposite to the rear face that is fixed to the rail). Each spring thus has an outside end 106a or 106'a and an inside end 106b or 106'b. Between the outside ends of the springs in each set of two adjacent pairs, there is a disconnection tunnel 107. The springs of each pair are held in the housing in such a manner that their inside ends are normally in resilient contact with each other, at a point in line with the corresponding disconnection tunnel 107. Each set of two adjacent pairs of springs can thus be simultaneously disconnected by inserting a disconnection peg of insulating material into the tunnel 107 and pushing it home far enough to interpose its insulating material between the inside ends 106b and 106'b of the springs. Wire-passing channels 109, 109' serve to provide paths from the front face to a side face.

The auxiliary module 104 is associated with the circuit-breaking module 101. The auxiliary module comprises a generally flat rectangular housing 111 having a printed circuit card 112 which forms one of its walls and which has one edge (the top edge in the figures) left free by an elongate opening 113 running parallel thereto. The outside end 106'a of each spring 106' is suitably hook-shaped (see FIG. 8) to provide electrical contact between the spring and an edge connector contact provided on the edge of the printed circuit card. The hook-shaped ends of the springs 106' also serve to hold the auxiliary module adjacent to the circuit-breaking module.

The two modules as held together by the hook-shaped ends of the springs 106' can be fixed as a single block to a support rail (not shown in FIGS. 7 and 8). Components such as resistors, lightning arrestors, diodes, etc; can be mounted on the printed circuit card and lodged inside the housing 111. The housing 111 may include holes for indicator lamps or light-emitting diodes (LEDs) 116, or else for push buttons or for jacks, etc. In an alternative arrangement, the auxiliary module may itself be directly fixed to the rail just like an ordinary module.

In a variant, the outside ends 106a and 106'a may both project straight outwards, with the ends being connected to the auxiliary module card by lengths of wire. Advantageously, the thickness of the auxiliary module is chosen to be an integer multiple of the thickness of the circuit-breaking module, eg. twice its thickness.

The breaking zone (ie. the entrances to the tunnels 107) must be left free to receive break plugs, but the rest of the front face can receive labels or other markings.

Advantageously, the free-standing rail 2 or 40 is made of extruded aluminum bar, thereby reducing manufacturing costs, and making it possible, in practice, to choose any suitable cross section. By having an extruded bar of uninterrupted cross section, it possible to locate modules at any convenient point along the bar without having to comply with some predetermined minimum module step interval. Modules of various thicknesses can then be placed at will, even if they are not all multiples of some unit thickness. In particular module thickness may vary depending on constraints imposed by its function rather than by the need to fix it in a rigid grid plan. The bar provides all the necessary unity or cohesion for the overall structure.

I claim:

1. A modular connection system for a telephone distribution frame, said system comprising at least one vertical bar and a plurality of modules fixed to said bar, said modules being generally rectangular in shape, the improvement wherein the vertical bar is a free-standing extruded rail terminating in laterally projecting side strips to each side thereof having plane faces facing said module ending in outside edges, said plane faces defining module feed abutment zones, and said outside edges defining two hooking zones adjacent said abutment zones, and wherein each module includes two feet engaging respective abutment zones and two hooks to the outside of said feet and engaging rail side strip outside edges at said hooking zones, and wherein at least one of said hooks is flexible to facilitate a snap connection between said free-standing extruded rail and said modules.

2. A system according to claim 1, wherein the free-standing rail includes at least one fixing slot for receiving fixing means such as the head of a screw.

3. A system according to claim 1, wherein said plurality of modules comprises at least one auxiliary module, a printed circuit enclosed within said at least one auxiliary module, and said auxiliary module further comprising electronic components mounted on said printed circuit card for performing one of a line protection, line condition indication, and line matching function.

4. A system according to claim 3, wherein said at least one auxiliary module includes at least one opening for providing access to one of an indicator lamp, a pushbutton, a jack, and a plug-in unit.

5. A modular connection system for a telephone distribution frame, said system comprising at least one vertical bar and a plurality of modules fixed to said bar, said modules being generally rectangular in shape, the improvement wherein said vertical bar comprises a free-standing extruded rail terminating in laterally projecting side strips including plane faces adjacent to outside edges, said plane faces defining two abutment zones, and said outside edges defining two hooking zones within said side strips, each module including two feet for engaging said plane faces constituting said abutment zones respectively, and two hooks respectively to the outside of said feet and adjacent thereto for engagng said side strip outside edges defining said hooking zones, and wherein at least one of said hooks is flexible to facilitate snap connection of said modules to said free-standing extending rail, and wherein each module includes a wire-guide on at least one side thereof.

* * * * *